United States Patent
Kakiya

(10) Patent No.: US 11,632,306 B2
(45) Date of Patent: Apr. 18, 2023

(54) ONBOARD SYSTEM, COMMUNICATION METHOD, AND NON-TRANSITORY STORAGE MEDIUM

(71) Applicant: TOYOTA JIDOSHA KABUSHIKI KAISHA, Toyota (JP)

(72) Inventor: Yoshinori Kakiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 17/504,655

(22) Filed: Oct. 19, 2021

(65) Prior Publication Data
US 2022/0191106 A1 Jun. 16, 2022

(30) Foreign Application Priority Data
Dec. 14, 2020 (JP) .............................. JP2020-206793

(51) Int. Cl.
*G06F 15/16* (2006.01)
*H04L 41/147* (2022.01)
*H04L 67/141* (2022.01)
*H04L 67/12* (2022.01)

(52) U.S. Cl.
CPC ............ *H04L 41/147* (2013.01); *H04L 67/12* (2013.01); *H04L 67/141* (2013.01)

(58) Field of Classification Search
CPC ...... H04L 41/147; H04L 67/12; H04L 67/141
See application file for complete search history.

(56) References Cited

U.S. PATENT DOCUMENTS

| 2018/0109622 | A1* | 4/2018 | Galula | H04W 84/005 |
| 2020/0211301 | A1* | 7/2020 | Zhang | H04L 63/065 |
| 2020/0387605 | A1* | 12/2020 | Gilad | G06F 21/566 |
| 2021/0111874 | A1 | 4/2021 | Tanji et al. | |

FOREIGN PATENT DOCUMENTS

WO 2018/189885 A1 10/2018

* cited by examiner

*Primary Examiner* — Normin Abedin
(74) *Attorney, Agent, or Firm* — Oliff PLC

(57) ABSTRACT

An onboard system includes a first ECU and a second ECU respectively installed in a vehicle and configured to communicate with each other via a transmission path using session information. A first processor and a second processor are configured to detect a precursor to a communication anomaly. In a case in which the communication anomaly precursor has not been detected, the first processor and the second processor cause first session information to be stored in first volatile memory and second volatile memory, while not causing the first session information to be stored in second non-volatile memory or fourth non-volatile memory. In a case in which the communication anomaly precursor has been detected, the first processor and the second processor cause the first session information to be stored in at least the second non-volatile memory and the fourth non-volatile memory.

18 Claims, 8 Drawing Sheets

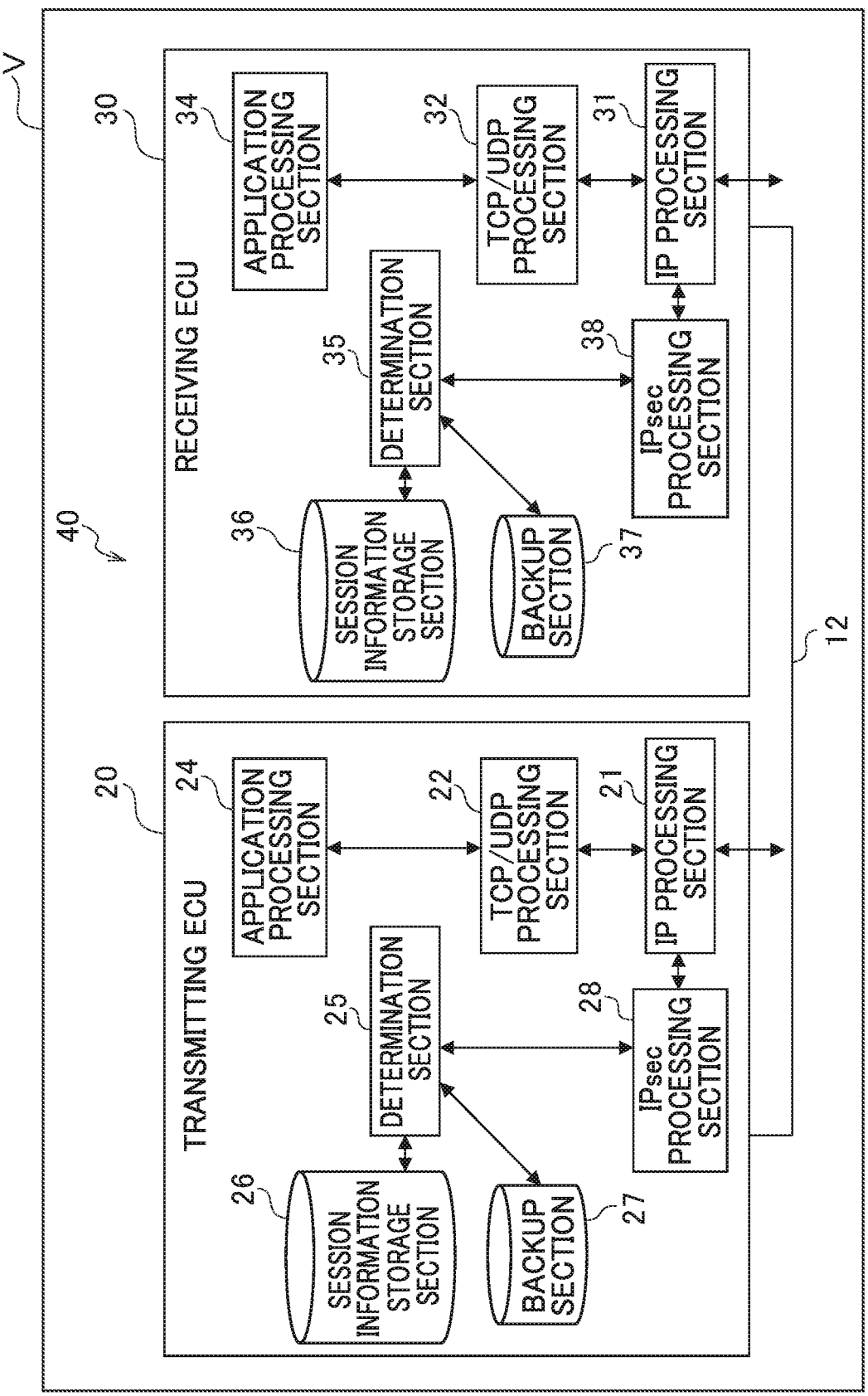

ONBOARD SYSTEM, COMMUNICATION METHOD, AND NON-TRANSITORY STORAGE MEDIUM

CROSS-REFERENCE TO RELATED APPLICATION

This application is based on and claims priority under 35 USC 119 from Japanese Patent Application No. 2020-206793 filed on Dec. 14, 2020, the disclosure of which is incorporated by reference herein.

BACKGROUND

Technical Field

The present disclosure relates to an onboard system, a communication method, and a non-transitory storage medium.

For example, International Publication (WO) No. 2018/189885 discloses technology relating to a key management system for ensuring communication security. In this prior art, an onboard unit or the like includes a non-volatile auxiliary storage device (non-volatile memory that is electronically data-rewritable). Various identification information, key information, and the like (information encompassing session information) is stored in the auxiliary storage device. In such prior art, when a reset is performed following a communication anomaly, session information stored in the non-volatile auxiliary storage device is used in order to enable processing to share session information to be omitted, thereby enabling secure communication to be restored quickly.

However, session information is frequently updated, and in consideration of limitations with regard to writing to the non-volatile memory of the onboard unit, it is unrealistic to store all session information in the non-volatile memory of the onboard unit. On the other hand, if the session information is not stored in the non-volatile memory of the onboard unit, secure communication cannot be restored quickly when a reset is performed following a communication anomaly.

SUMMARY

The present disclosure obtains an onboard system that enables secure communication to be restored quickly when a reset is performed following a communication anomaly, while suppressing the number of writes to a non-volatile memory.

An onboard system of a first aspect includes plural ECUs respectively installed in a vehicle and configured to communicate with each other via a transmission path, each of the plural ECUs including a volatile memory and a non-volatile memory that is electronically data-rewritable. Each of the plural ECUs includes a detection section configured to detect a precursor to a communication anomaly, and a management section configured to cause session information to be stored in the volatile memory, and in a case in which the detection section has detected a precursor to a communication anomaly, also cause the session information to be stored in the non-volatile memory.

According to the above configuration, the plural ECUs, each including the volatile memory and the non-volatile memory that is electronically data-rewritable, are respectively installed in the vehicle and communicate with each other via the transmission path. Each of the plural ECUs includes the detection section and the management section. The detection sections are configured to detect a precursor to a communication anomaly. The management sections cause the session information to be stored in the corresponding volatile memory, and in a case in which the detection section has detected the precursor to a communication anomaly, also cause the session information to be stored in the corresponding non-volatile memory. The number of writes to the non-volatile memory can be suppressed as a result, and secure communication can be restored quickly when a reset is performed following a communication anomaly by utilizing the session information stored in the corresponding non-volatile memory.

An onboard system of a second aspect is the configuration of the first aspect, wherein in a case in which the detection section has detected the precursor to a communication anomaly, based on a predetermined criterion, the management section generates new session information that is different from the session information stored in the volatile memory, and causes this new session information to be stored in the corresponding non-volatile memory.

According to the above configuration, in a case in which the detection section has detected the precursor to a communication anomaly, the new session information that is different from the session information stored in the volatile memory is stored in the corresponding non-volatile memory. This enables the likelihood of thwarting a replay attack by a malevolent third party to be increased.

An onboard system according to a third aspect is the configuration of the second aspect, wherein in a case in which the detection section has detected the precursor to a communication anomaly, the management section generates the new session information on one occasion only, the new session information being information including information of the session information stored in the volatile memory from which a sequence number has been excluded, and also including a value that is updated at a predetermined timing and that can be acquired from the vehicle itself, and causes the new session information to be stored in the non-volatile memory.

According to the above configuration, the new session information generated in a case in which the detection section has detected the precursor to a communication anomaly is information including information of the session information stored in the volatile memory from which the sequence number has been excluded and also including a value that is updated at a predetermined timing and that can be acquired from the ego vehicle. This new session information is generated on one occasion only and stored in the non-volatile memory. When, for example, session information is stored in the volatile memory plural times while a precursor to a communication anomaly is being detected by the detection section, with the exception of the sequence number the session information is the same information each time. By generating the new session information on one occasion only and therefore writing the new session information to the non-volatile memory on one occasion only while the precursor to a communication anomaly is being detected by the detection section as described above, the number of writes to the non-volatile memory can be efficiently reduced.

As described above, the onboard system of the present disclosure exhibits the excellent advantageous effect of enabling secure communication to be restored quickly when a reset is performed following a communication anomaly, while suppressing the number of writes to a non-volatile memory.

BRIEF DESCRIPTION OF THE DRAWINGS

Exemplary embodiments of the present invention will be described in detail based on the following figures, wherein:

FIG. 10 is a block diagram illustrating an example of a schematic configuration of an onboard system according to a second exemplary embodiment.

DETAILED DESCRIPTION

First Exemplary Embodiment

Explanation follows regarding an onboard system according to a first exemplary embodiment of the present disclosure, with reference to FIG. 1 to FIG. 9.

Figure 1:
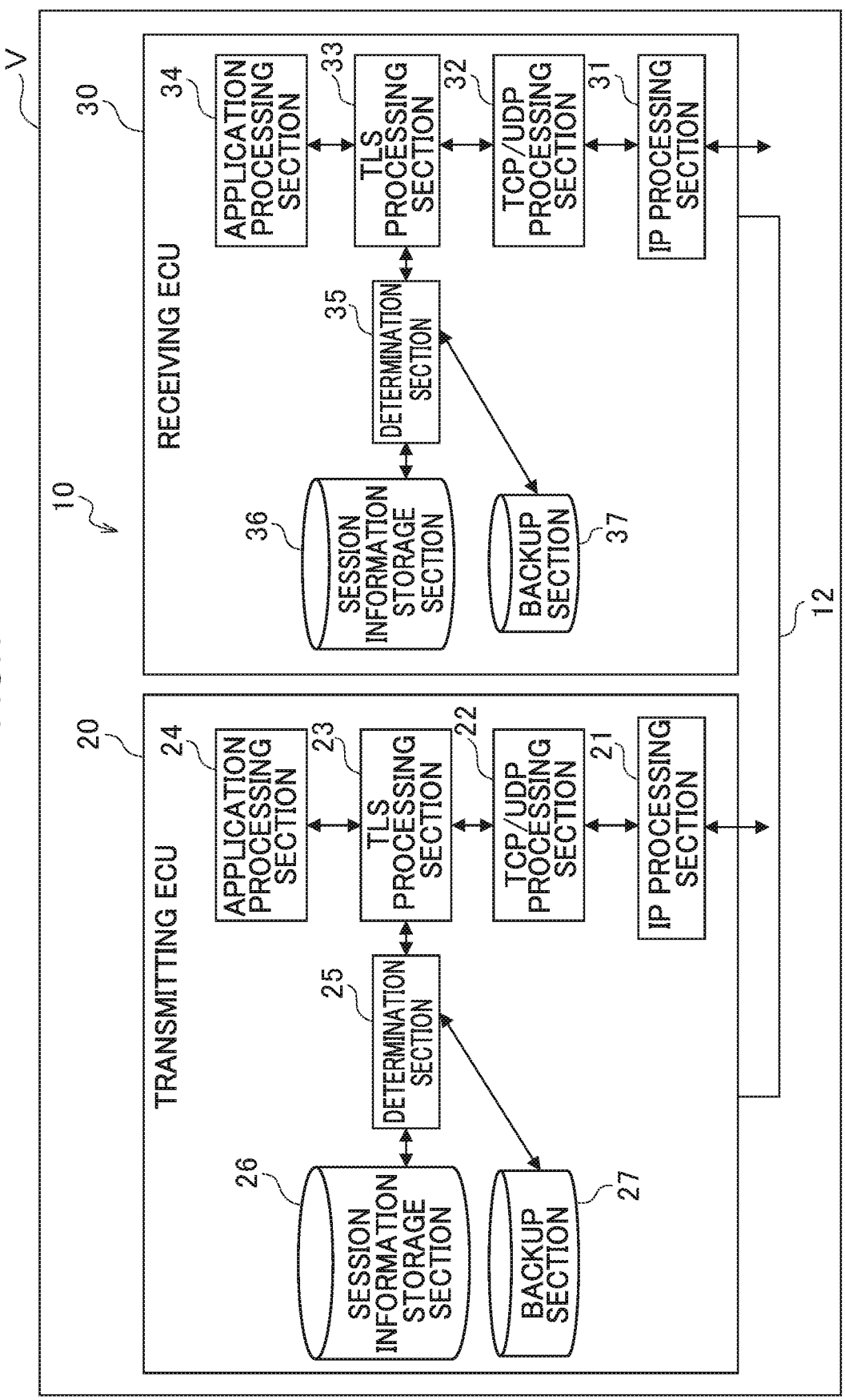
FIG. 1 is a block diagram illustrating an example of a schematic configuration of an onboard system according to a first exemplary embodiment.

FIG. 1 is a block diagram illustrating an example of a schematic configuration of an onboard system 10 according to the first exemplary embodiment. As illustrated in FIG. 1, the onboard system 10 includes a transmitting electronic control unit (ECU) 20 and a receiving ECU 30 serving as plural ECUs that communicate through a bus 12 serving as a transmission path. The transmitting ECU 20 serves as a first ECU or one ECU, the receiving ECU 30 serves as a second ECU or another ECU, and both ECUs are installed in a vehicle V. The bus 12 connects the transmitting ECU 20 and the receiving ECU 30 together. In the onboard system 10, messages are exchanged by communication between the transmitting ECU 20 and the receiving ECU 30. Note that although FIG. 1 illustrates a total of two ECUs, namely a single transmitting ECU 20 and a single receiving ECU 30, the total number of ECUs may be three or more.

The transmitting ECU 20 is connected to the bus 12 in order to transmit messages into the bus 12. The receiving ECU 30 is connected to the bus 12 in order to receive messages from the bus 12. The bus 12 is a transmission path that transmits the messages exchanged between the transmitting ECU 20 and the receiving ECU 30, employing for example a protocol such as Ethernet (registered trademark).

The transmitting ECU 20 includes an internet protocol (IP) processing section 21, a transmission control protocol/ user datagram protocol (TCP/UDP) processing section 22, a transport layer security (TLS) processing section 23, an application processing section 24, a determination section 25, a session information storage section 26, and a backup section 27. The IP processing section 21, the TCP/UDP processing section 22, the TLS processing section 23, the application processing section 24, and the determination section 25 are functional blocks implemented by a CPU 20A (see FIG. 2) executing a program. Note that the bidirectional arrows illustrated in FIG. 1 indicate interfaces between the respective elements.

The receiving ECU 30 includes an internet protocol (IP) processing section 31, a transmission control protocol/user datagram protocol (TCP/UDP) processing section 32, a transport layer security (TLS) processing section 33, an application processing section 34, a determination section 35, a session information storage section 36, and a backup section 37. The IP processing section 31, the TCP/UDP processing section 32, the TLS processing section 33, the application processing section 34, and the determination section 35 are functional blocks implemented by a CPU 30A (see FIG. 3) executing a program.

The IP processing sections 21, 31 perform internet layer processing. The TCP/UDP processing sections 22, 32 perform transport layer processing. The TLS processing sections 23, 33 perform common key encryption processing so as to enable use of a secure channel (communication path).

The application processing section 24 of the transmitting ECU 20 performs processing to transmit messages to a communication partner. The application processing section 34 of the receiving ECU 30 performs processing to receive messages from a communication partner.

The session information storage sections 26, 36 are storage sections that store session information. Examples of session information stored in the session information storage sections 26, 36 includes a session ID, address information, an encryption algorithm, an encryption key, and a sequence number. The session ID is an identifier that identifies the particular session. The address information is information including the IP addresses and port numbers of both the transmitting ECU 20 that established the session and the receiving ECU 30. The encryption algorithm is an encryption algorithm used for secure communication. The encryption key is an encryption key used for secure communication. The sequence number is a sequential number for preventing replay attacks (attacks in which previously transmitted legitimate messages are re-used).

The backup sections 27, 37 are backup storage sections for storing session information in a predetermined case (described later). The session information stored in the backup sections 27, 37 is described later. The determination sections 25, 35 determine whether or not search target data is present in the corresponding session information storage section 26 or 36, and also determine whether or not usable data is present in the corresponding backup section 27 or 37 in a predetermined case.

Figure 2:
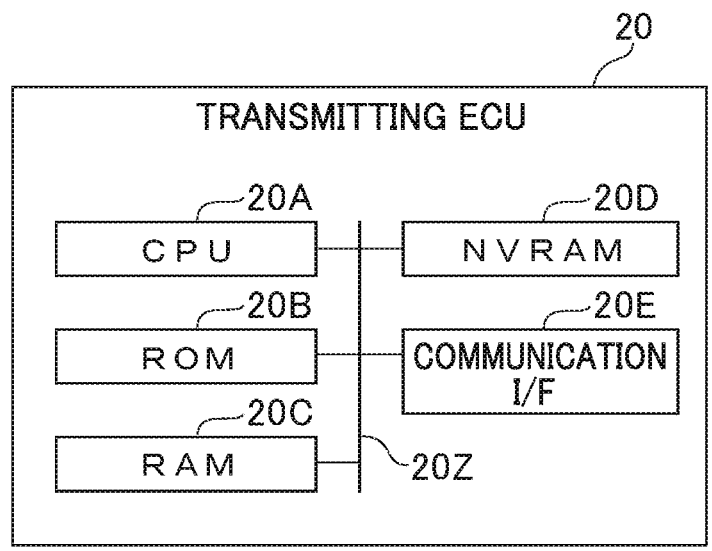
FIG. 2 is a block diagram illustrating an example of a hardware configuration of a transmitting ECU.

FIG. 2 is a block diagram illustrating an example of a hardware configuration of the transmitting ECU 20. As illustrated in FIG. 2, the transmitting ECU 20 includes the central processing unit (CPU; serving as a processor) 20A, read only memory (ROM) 20B configured by non-volatile memory that is non-electronically data-rewritable, random access memory (RAM) 20C serving as volatile memory, non-volatile RAM (NVRAM) 20D serving as non-volatile memory that is electronically data-rewritable, and a communication interface (I/F) 20E. The CPU 20A, the ROM 20B, the RAM 20C, the NVRAM 20D, and the communication I/F 20E are connected so as to be capable of communicating with each other through a bus 20Z.

Figure 3:
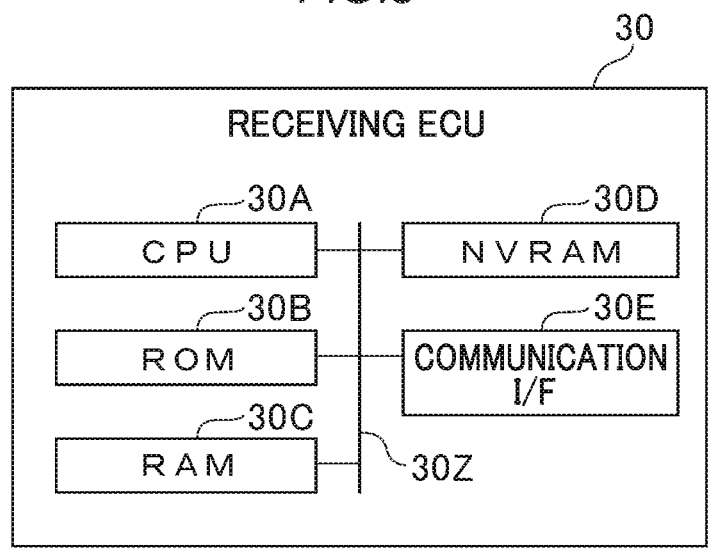
FIG. 3 is a block diagram illustrating an example of a hardware configuration of a receiving ECU.

FIG. 3 is a block diagram illustrating an example of a hardware configuration of the receiving ECU 30. As illustrated in FIG. 3, the receiving ECU 30 includes the central processing unit (CPU; serving as a processor) 30A, read only memory (ROM) 30B configured by non-volatile memory that is not electronically data-rewritable, random access memory (RAM) 30C serving as volatile memory, non-volatile RAM (NVRAM) 30D serving as non-volatile memory that is electronically data-rewritable, and a communication interface (I/F) 30E. The CPU 30A, the ROM 30B, the RAM 30C, the NVRAM 30D, and the communication I/F 30E are connected so as to be capable of communicating with each other through a bus 30Z.

The CPUs 20A, 30A illustrated in FIG. 2 and FIG. 3 are central processing units that execute various programs and control various sections. Namely, the CPU 20A serving as a first processor and the CPU 30A serving as a second processor read a program from the corresponding ROM 20B serving as first non-volatile memory or ROM 30B serving as third non-volatile memory, and execute the program using the corresponding RAM 20C serving as first volatile memory or RAM 30C serving as second volatile memory as a workspace. The CPUs 20A, 30A control the various configurations and perform various computation processing according to the programs stored in the ROMs 20B, 30B.

The ROMs 20B, 30B hold various programs and various data. The RAMs 20C, 30C serve as workspaces to temporarily store programs and data. The RAM 20C includes the session information storage section 26 (FIG. 1) and the RAM 30C includes the session information storage section 36 (FIG. 1). The NVRAM 20D serves as a second non-volatile memory and the NVRAM 30D serves as a fourth non-volatile memory; both are configured by flash memory as an example, and store various programs and various data. The NVRAM 20D includes the backup section 27 (see FIG. 1), and the NVRAM 30D includes the backup section 37 (see FIG. 1). The communication I/Fs 20E, 30E are interfaces for communicating with other equipment, for example by employing an Ethernet (registered trademark) protocol.

Figure 4:
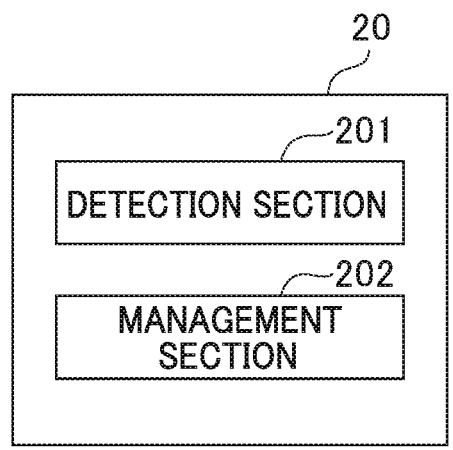
FIG. 4 is a block diagram illustrating an example of a functional configuration of a transmitting ECU.

FIG. 4 is a block diagram illustrating an example of functional configuration of the transmitting ECU 20. As illustrated in FIG. 4, the transmitting ECU 20 includes a detection section 201 and a management section 202 as functional configuration. The respective functional configuration is implemented by the CPU 20A reading and executing a program stored in the ROM 20B.

Figure 5:
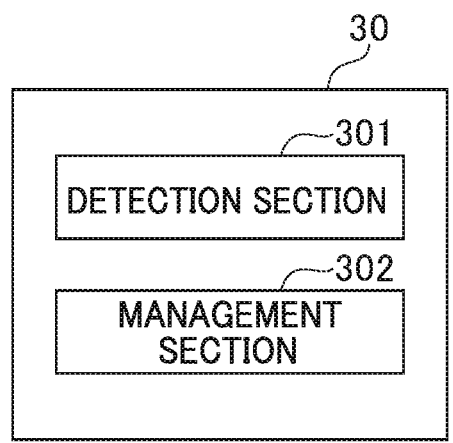
FIG. 5 is a block diagram illustrating an example of a functional configuration of a receiving ECU.

FIG. 5 is a block diagram illustrating an example of functional configuration of the receiving ECU 30. As illustrated in FIG. 5, the receiving ECU 30 includes a detection section 301 and a management section 302 as functional configuration. The respective functional configuration is implemented by the CPU 30A reading and executing a program stored in the ROM 30B.

The detection sections 201, 301 illustrated in FIG. 4 and FIG. 5 are configured to detect precursors to communication anomalies. For example, dropping of a battery voltage to a threshold or below, or the ECU (transmitting ECU 20 or receiving ECU 30) itself transitioning to a fail state, are detected as precursors to a communication anomaly.

The management sections 202, 302 cause session information to be stored in the session information storage section 26 or 36 of the corresponding RAM 20C or 30C, and also cause session information to be stored in the backup section 27 or 37 of the corresponding NVRAM 20D or 30D in a case in which the corresponding detection section 201 or 301 has detected a precursor to a communication anomaly. As an example, in a case in which the detection section 201 or 301 has detected a precursor to a communication anomaly, based on a predetermined criterion the corresponding management section 202 or 302 generates new session information that is different from the session information stored in the session information storage section 26 or 36 of the corresponding RAM 20C or 30C, and causes this new session information to be stored in the backup section 27 or 37 of the corresponding NVRAM 20D or 30D.

More specifically, in a case in which the detection section 201 or 301 has detected a precursor to a communication anomaly, the corresponding management section 202 or 302 of the present exemplary embodiment generates information on one occasion only as new session information, and causes this new session information to be stored in the backup section 27 or 37 of the corresponding NVRAM 20D or 30D. This generated information includes the information of the session information stored in the session information storage section 26 or 36 of the corresponding RAM 20C or 30C from which the sequence number has been excluded and also including a value (hereafter referred to as the "unique value" as appropriate) that is updated at a predetermined timing and that can be acquired from the vehicle V configuring the ego vehicle. Note that a trip counter value (a value that is incremented each time the power of the vehicle V is switched on), a value including information relating to the date and time (such as a value indicating the year, month, day, and time), or the like are examples of values (unique values) that are updated at a predetermined timing and can be acquired from the vehicle V configuring the ego vehicle.

Figure 6:
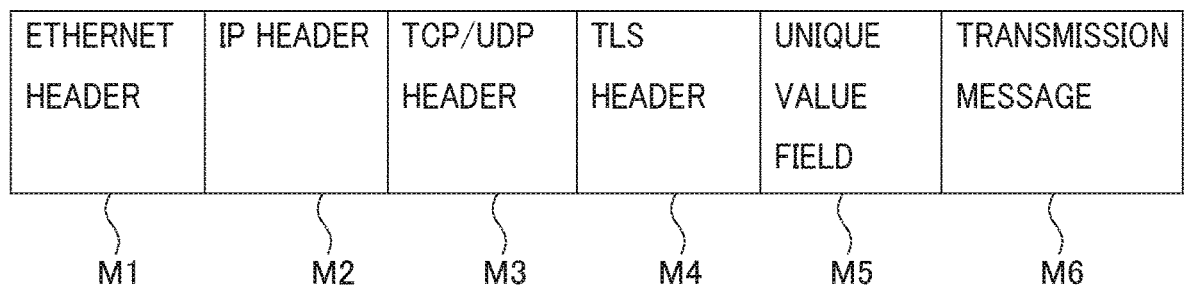
FIG. 6 is an illustrative diagram of an example of a message format.

FIG. 6 is an illustrative diagram of an example of the message format of a package employed in communication. The structure of the message format includes an Ethernet header M1, an IP header M2, a TCP/UDP header M3, a TLS header M4, a unique value field M5, and a transmission message M6, set in this sequence. The unique value field M5 is normally set to ALL0, but is overwritten with the unique value when employing values from the backup section 27 (see FIG. 1).

Figure 7:
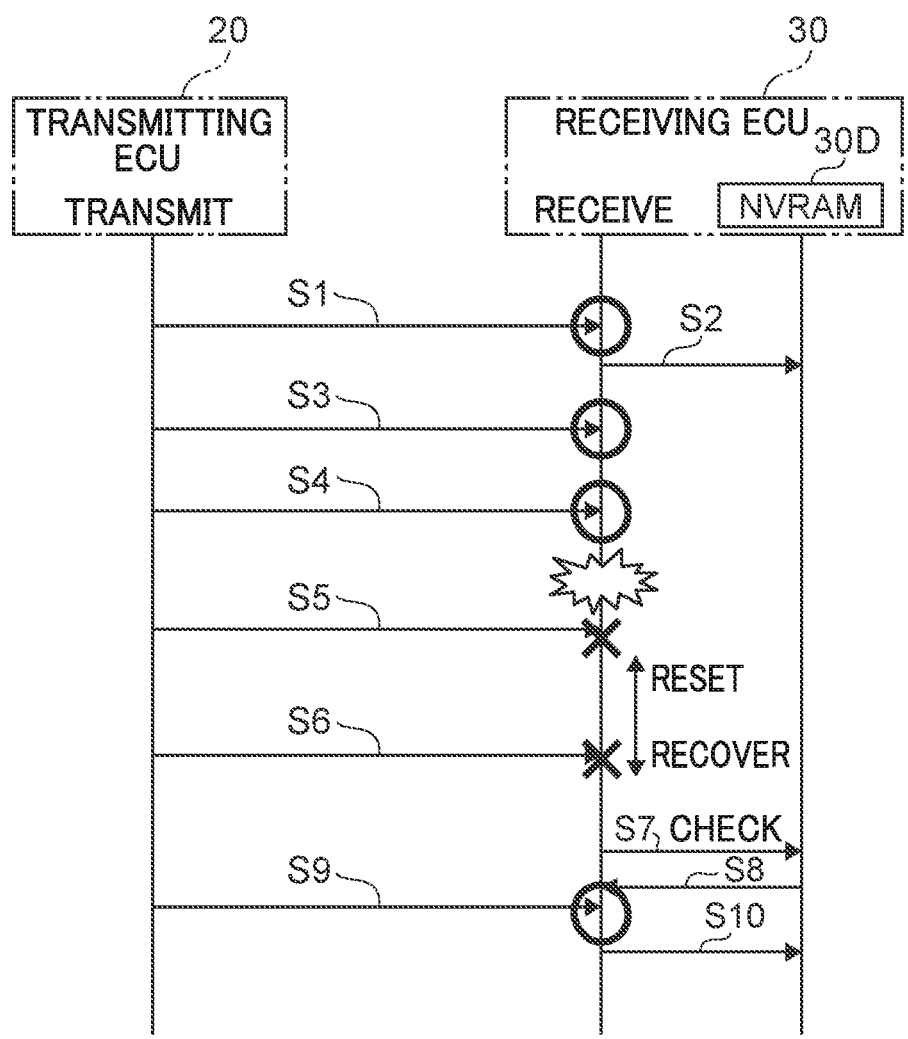
FIG. 7 is a diagram illustrating an example of operation of an onboard system.

Next, explanation follows regarding an example of operation of the onboard system 10, with reference to FIG. 7.

At step S1 in FIG. 7, the transmitting ECU 20 transmits a message including segmented data, configured by segmenting transmission data, to the receiving ECU 30. The receiving ECU 30 receives this message. Then, in a case in which a precursor to a communication anomaly (such as the battery voltage dropping to a threshold or below) has been detected by the receiving ECU 30 (namely in a case in which the receiving ECU 30 may be reset), at step S2, the CPU 30A causes session information to be stored in the NVRAM 30D. When this is performed, the CPU 30A generates new session information, this being information including the session information stored in the RAM 30C from which the sequence number has been excluded and also including a value (unique value) that is updated at a predetermined timing and that can be acquired from the vehicle V configuring the ego vehicle, and causes this new session information to be stored in the NVRAM 30D. Although not illustrated in the drawings, the CPU 20A of the transmitting ECU 20 similarly causes new session information to be stored in the NVRAM 20D in a case in which a precursor to a communication anomaly has been detected.

Next, the transmitting ECU 20 transmits a message to the receiving ECU 30 at step S3 and the transmitting ECU 20 transmits a message to the receiving ECU 30 at step S4 in the state in which the precursor to a communication anomaly (such as a state in which the battery voltage has dropped to a threshold or below) has been detected. Even if the receiving ECU 30 receives these messages, the receiving ECU 30 does not store the session information of these messages by overwriting the NVRAM 30D. Note that with the exception of the sequence number, the values in the session information stored in the RAM 30C are fixed when a session is established, and so these values would remain unchanged even were the NVRAM 30D to be overwritten at steps S3 and S4.

Communication fails in a case in which the transmitting ECU 20 then transmits a message to the receiving ECU 30 at step S5 and the transmitting ECU 20 transmits a message to the receiving ECU 30 at step S6 during a process in which, for example, the receiving ECU 30 is being restarted in order to reset the receiving ECU 30 after shutting down due to the anomaly. Note that while communication is interrupted, these messages are retained by the transmitting ECU 20 in a transmission stand-by state in a buffer for holding transmission target messages. When the receiving ECU 30 then recovers, at step S7, the CPU 30A of the receiving ECU 30 checks for session information stored in the NVRAM 30D. In a case in which the relevant session information is present, at step S8, the CPU 30A enables the TLS processing section 33 to perform processing using this information. This enables the secure communication to be restored.

Then, at step S9, the transmitting ECU 20 transmits a message that was held in the transmission standby state to the receiving ECU 30, and the receiving ECU 30 receives this message. Note that in a case in which the receiving ECU 30 detects a fresh precursor to a communication anomaly, at step S10, the CPU 30A causes this session information to be stored in the NVRAM 30D. In a case in which the receiving ECU 30 receives data allocated a unique value from the transmitting ECU 20, as long as message authenticator verification has a successful outcome, the sequence number of the target session in the RAM 30C is overwritten (updated) with the received sequence number.

Figure 8:
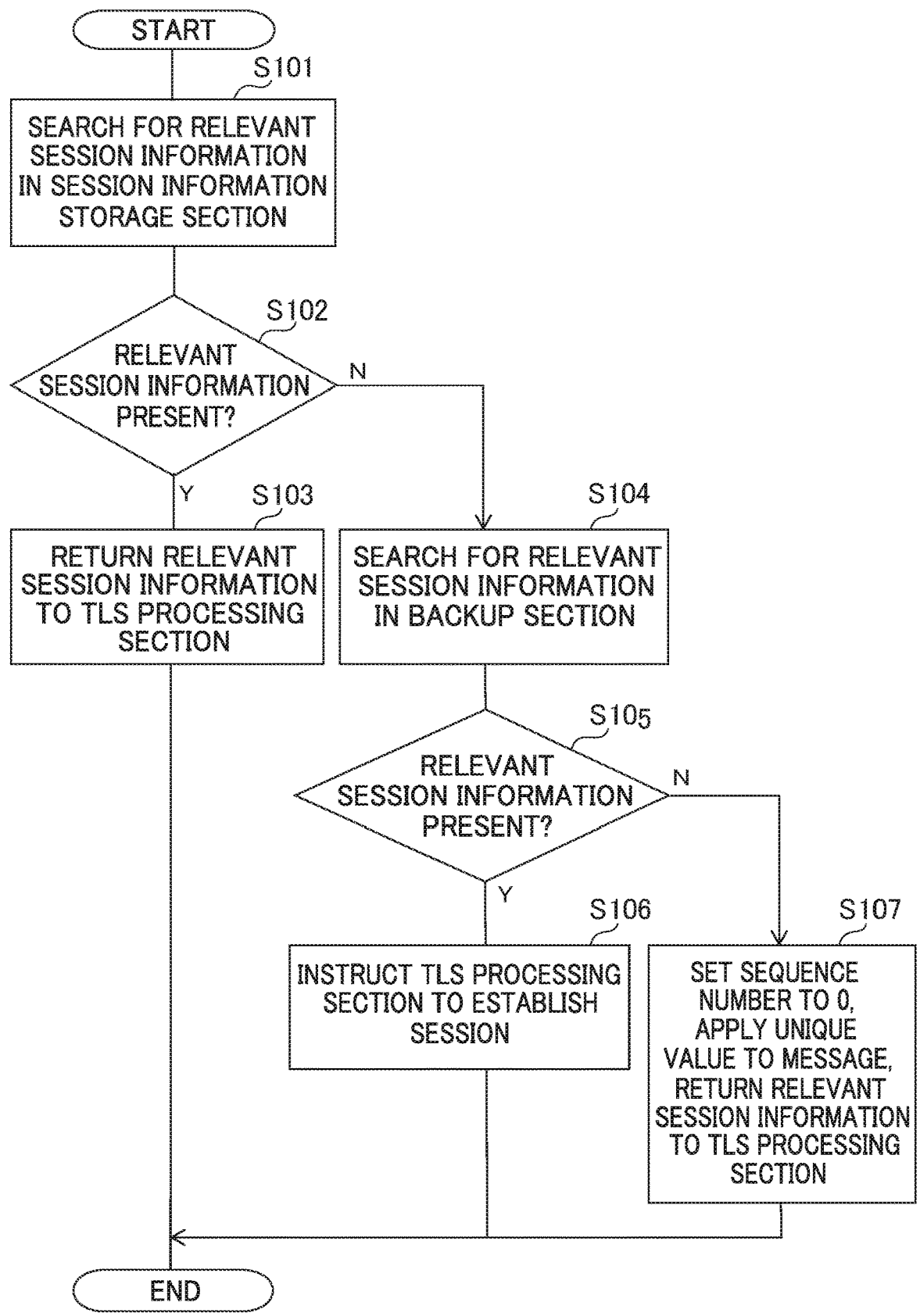
FIG. 8 is a flowchart illustrating an example of a flow of processing including a search for session information by a transmitting ECU.

Next, explanation follows regarding processing including a search for session information performed by the transmitting ECU 20 (processing relating to the determination section 25 illustrated in FIG. 1), with reference to FIG. 8.

FIG. 8 is a flowchart illustrating an example of a flow of processing including a session information search performed by the transmitting ECU 20. The control processing performed by the transmitting ECU 20 and illustrated in FIG. 8 is performed by the CPU 20A reading from the ROM 20B a program for executing the flow illustrated in FIG. 8, and expanding and executing the program in the RAM 20C. The control processing illustrated in FIG. 8 is performed when the application processing section 24 of the transmitting ECU 20 illustrated in FIG. 1 requests the TLS processing section 23 to perform data transmission, and the TLS processing section 23 attempts to check session information using the determination section 25 in response to this request.

First, the CPU 20A searches for relevant session information in the session information storage section 26 (step S101). Next, the CPU 20A determines whether or not the relevant session information is present in the session information storage section 26 (step S102).

In a case in which relevant session information is present in the session information storage section 26 (step S102: Y), the CPU 20A returns the relevant session information to the TLS processing section 23 (step S103), reverts the processing to a standard processing sequence of the TLS processing section 23, and ends the processing illustrated in FIG. 8. In a case in which relevant session information is not present in the session information storage section 26 (step S102: N), the CPU 20A transitions to the processing of step S104.

At step S104, the CPU 20A searches for relevant session information in the backup section 27. Next, the CPU 20A determines whether or not relevant session information is present in the backup section 27 (step S105).

In a case in which relevant session information is not present in the backup section 27 (step S105: N), the CPU 20A instructs the TLS processing section 23 to establish a session (step S107), and ends the processing illustrated in FIG. 8. Note that a case in which relevant session information is not present in the backup section 27 (step S105: N) include a case in which this is the first communication with the receiving ECU 30 configuring the communication partner.

In a case in which relevant session information is present in the backup section 27 (step S105: Y), the CPU 20A sets the sequence number to 0, applies the unique value of the relevant session information to the unique value field M5 (see FIG. 6) of the message for transmission, returns the relevant session information to the TLS processing section 23 (step S106), reverts the processing to a standard processing sequence of the TLS processing section 23, and ends the processing illustrated in FIG. 8. Note that the processing performed by the TLS processing section 23 after transitioning to step S106 is implemented using existing functionality, and the session information in the session information storage section 26 is updated during this processing.

Figure 9:
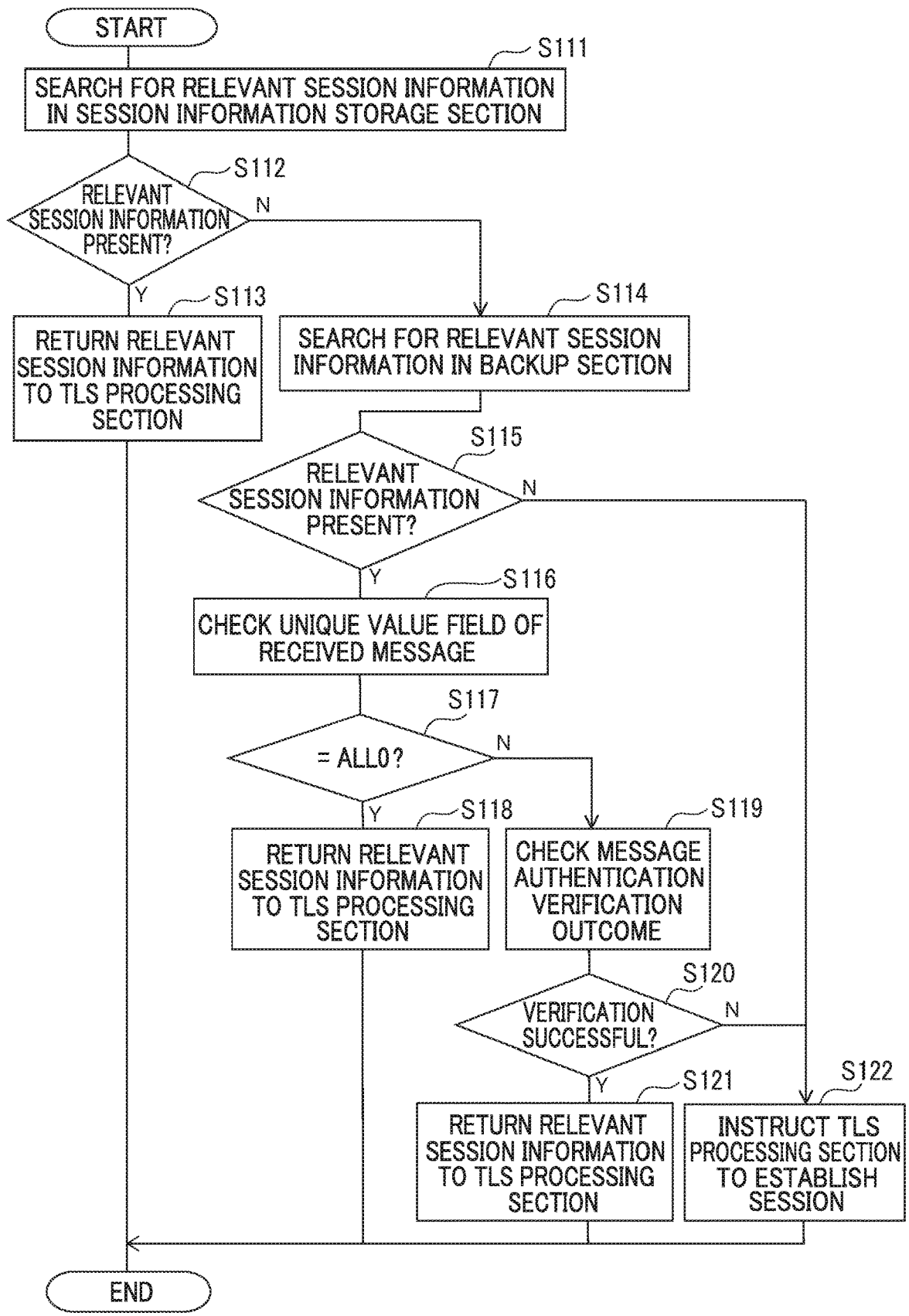
FIG. 9 is a flowchart illustrating an example of a flow of processing including a search for session information by a receiving ECU.

Next, explanation follows regarding processing including a search for session information performed by the receiving ECU 30A (processing relating to the determination section 35 illustrated in FIG. 1), with reference to FIG. 9.

FIG. 9 is a flowchart illustrating an example of a flow of processing including a session information search performed by the receiving ECU 30. The control processing performed by the receiving ECU 30 and illustrated in FIG. 9 is performed by the CPU 30A reading from the ROM 30B a program for executing the flow illustrated in FIG. 9, and expanding and executing the program in the RAM 30C. The control processing illustrated in FIG. 9 is performed when the application processing section 34 of the receiving ECU 30 illustrated in FIG. 1 requests the TLS processing section 33 to receive data, and the TLS processing section 33 attempts to check session information using the determination section 35 in response to this request.

First, the CPU 30A searches for relevant session information in the session information storage section 36 (step S111). Next, the CPU 30A determines whether or not relevant session information is present in the session information storage section 36 (step S112).

In a case in which relevant session information is present in the session information storage section 36 (step S112: Y), the CPU 30A returns the relevant session information to the TLS processing section 33 (step S113), reverts the processing to a standard processing sequence of the TLS processing section 33, and ends the processing illustrated in FIG. 9. In a case in which relevant session information is not present in the session information storage section 36 (step S112: N), the CPU 30A transitions to the processing of step S114.

At step S114, the CPU 30A searches for the relevant session information in the information, excluding the unique value, in the backup section 37 as a search target. Next, the CPU 30A determines whether or not the relevant session information is present in the information in the backup section 37, excluding the unique value, serving as the search target (step S115).

In a case in which the relevant session information is not present in the information in the backup section 37, excluding the unique value, serving as the search target (step S115: N), the CPU 30A instructs the TLS processing section 33 to establish a session (step S122), and ends the processing illustrated in FIG. 9. Note that a case in which the relevant session information is not present in the information in the backup section 37, excluding the unique value, serving as the search target (step S115: N) include a case in which this is the first communication with the transmitting ECU 20 configuring the communication partner.

In a case in which the relevant session information is present in the information in the backup section 37, excluding the unique value, serving as the search target (step S115: Y), the CPU 30A checks the unique value field M5 (see FIG. 6) of the received message (step S116). Next, the CPU 30A determines whether or not the value of the unique value field M5 in the received message is ALL0 (step S117).

In a case in which the value of the unique value field M5 of the received message is ALL0 (step S117: Y), the CPU 30A returns the relevant session information to the TLS processing section 33 (step S118), reverts the processing to a standard processing sequence of the TLS processing section 33, and ends the processing illustrated in FIG. 9. In a case in which the value of the unique value field M5 in the received message is not ALL0 (step S117: N), the CPU 30A transitions to the processing of step S119.

At step S119, the CPU 30A checks the outcome of message authentication verification. Next, the CPU 30A determines whether or not the message authentication verification had a successful outcome (step S120).

In a case in which the message authentication verification had a successful outcome (step S120: Y), the CPU 30A returns the relevant session information to the TLS processing section 33 (step S121), reverts the processing to a standard processing sequence of the TLS processing section 33, and ends the processing illustrated in FIG. 9. Note that the processing performed by the TLS processing section 33 after transitioning to step S118 and step S121 is implemented using existing functionality, and the session information in the session information storage section 36 is updated during this processing. In a case in which the message authentication verification did not have a successful outcome (step S120: N), the CPU 30A instructs the TLS processing section 33 to establish a session (step S122), and ends the processing illustrated in FIG. 9.

Supplementary explanation follows regarding operation of the present exemplary embodiment described above. The management sections 202, 302 illustrated in FIG. 4 and FIG. 5 cause the session information to be stored in the corresponding RAM 20C or 30C configured by volatile memory, and in a case in which the corresponding detection section 201 or 301 has detected a precursor to a communication anomaly, also cause the session information to be stored in the corresponding NVRAM 20D or 30D configured by non-volatile memory. The number of writes to the RAMs 20C, 30C can be suppressed as a result, and secure communication can be restored quickly when a reset is performed following a communication anomaly by utilizing the session information stored in the corresponding NVRAM 20D or 30D.

Moreover, in the present exemplary embodiment, in a case in which the detection section 201 or 301 has detected a precursor to a communication anomaly, new session information that is different from the session information stored in the corresponding RAM 20C or 30C is stored in the corresponding NVRAM 20D or 30D. This enables the likelihood of thwarting a replay attack by a malevolent third party to be increased.

Furthermore, the new session information generated in a case in which the detection section 201 or 301 has detected a precursor to a communication anomaly is information including information of the session information stored in the session information storage section 26 or 36 of the corresponding RAM 20C or 30C from which the sequence number has been excluded and also including a value (unique value) that is updated at a predetermined timing and that can be acquired from the vehicle V configuring the ego vehicle. This new session information is generated on one occasion only and stored in the corresponding NVRAM 20D or 30D. When, for example, session information is stored in the RAM 20C or 30C plural times while a precursor to a communication anomaly is being detected by the corresponding detection section 201 or 301, with the exception of the sequence number the session information is the same information each time. By generating the new session information on one occasion only and therefore writing the new session information to the corresponding NVRAM 20D or 30D on one occasion only while a precursor to a communication anomaly is being detected by the corresponding detection section 201, 301, the number of writes to the corresponding NVRAM 20D, 30D can be efficiently reduced.

As described above, the onboard system 10 of the present exemplary embodiment enables secure communication to be restored quickly when a reset is performed following a communication anomaly, while suppressing the number of writes to the NVRAMs 20D, 30D configured by non-volatile memory.

Second Exemplary Embodiment

Next, explanation follows regarding a second exemplary embodiment, with reference to FIG. 10 while also referring back to FIG. 2 to FIG. 5. An onboard system 40 of the present exemplary embodiment is similar to the onboard system 10 of the first exemplary embodiment, with the exception of the points described below. Sections that are basically the same as those in the first exemplary embodiment are allocated the same reference numerals and explanation thereof is omitted. Since a hardware configuration of the onboard system 40 of the present exemplary embodiment is similar to the hardware configuration of the onboard system 10 of the first exemplary embodiment (see FIG. 2 and FIG. 3), the illustration of FIG. 2 and FIG. 3 is reused, and detailed explanation thereof is omitted.

FIG. 10 is a block diagram illustrating an example of a schematic configuration of the onboard system 40 according to the second exemplary embodiment. Note that although the transmitting ECU 20 of the present exemplary embodiment differs from the transmitting ECU 20 of the first exemplary embodiment (see FIG. 1) in the respect that the TLS processing section 23 (see FIG. 1) of the transmitting ECU 20 of the first exemplary embodiment is not included and that an IPsec processing section 28 is provided instead, the same reference numerals as those of the transmitting ECU 20 of the first exemplary embodiment are allocated in the interests of simplicity. Similarly, although the receiving ECU 30 of the present exemplary embodiment differs from the receiving ECU 30 of the first exemplary embodiment (see FIG. 1) in the respect that the TLS processing section 33 (see FIG. 1) of the receiving ECU 30 of the first exemplary embodiment is not included and that an IPsec processing section 38 is provided instead, the same reference numerals as those of the receiving ECU 30 of the first exemplary embodiment are allocated in the interests of simplicity. The IPsec processing sections 28, 38 illustrated in FIG. 10 perform encryption processing in order to perform secure communication using IPsec. Note that the bidirectional arrows illustrated in FIG. 10 indicate interfaces between the respective elements.

In the transmitting ECU 20 of the present exemplary embodiment, as an example, when a session is established by the IPsec processing section 28, the CPU 20A applies an algorithm employed by both the transmitting ECU 20 and the receiving ECU 30 to a held encryption key (common key) so as to generate an encryption key that is different from an original encryption key, and causes this generated encryption key to be stored in the RAM 20C. Moreover, the management section 202 (see FIG. 4) of the present exemplary embodiment causes the session information to be stored in the RAM 20C, and in a case in which the detection section 201 (see FIG. 4) has detected a precursor to a communication anomaly also causes the session information including the encryption key that, as described above, is different from the original encryption key to be stored in the NVRAM 20D.

In the receiving ECU 30 of the present exemplary embodiment, as an example, when a session is established by the IPsec processing section 38, the CPU 30A applies the algorithm employed by both the transmitting ECU 20 and the receiving ECU 30 to a held encryption key (common key) so as to generate an encryption key that is different from an original encryption key, and causes this generated encryption key to be stored in the RAM 30C. Moreover, the management section 302 (see FIG. 5) of the present exemplary embodiment causes the session information to be stored in the RAM 30C, and in a case in which the detection section 301 (see FIG. 5) has detected a precursor to a communication anomaly also causes the session information including the encryption key that, as described above, is different from the original encryption key to be stored in the NVRAM 30D.

Examples of algorithms used to generate an encryption key that is different to an original encryption key include methods employing a hash function, and methods in which the values of predetermined instructed bit positions of the encryption key (configured by 128 bits, 256 bits, or the like) are inverted.

The second exemplary embodiment described above also enables secure communication to be restored quickly when a reset is performed following a communication anomaly, while suppressing the number of writes to the NVRAMs 20D, 30D configured by non-volatile memory. Moreover, the likelihood of thwarting a replay attack by a malevolent third party can be increased.

Supplementary Explanation of Exemplary Embodiments

In the first and second exemplary embodiments, in a case in which the detection section 201 or 301 has detected a precursor to a communication anomaly, the corresponding management section 202 or 302 generates new session information that is different from the session information stored in the corresponding RAM 20C or 30C based on a predetermined criterion, and causes this new session information to be stored in the corresponding NVRAM 20D or 30D. As a configuration that may be adopted in a modified example of the above exemplary embodiments, in a case in which a detection section (201, 301) has detected a precursor to a communication anomaly, a management section (202, 302) may cause the session information stored in RAM (20C, 30C) to be stored in NVRAM (20D, 30D).

Note that the respective processing executed by the CPUs 20A, 30A illustrated in FIG. 2 and FIG. 3 reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The respective processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

The respective programs described in the above exemplary embodiments may be provided in a format stored on a non-transitory storage medium such as compact disc read only memory (CD-ROM), digital versatile disc read only memory (DVD-ROM), or universal serial bus (USB) memory. Alternatively, the programs may be provided in a format downloadable from an external device over a network.

The above exemplary embodiments and modified examples may be implemented in appropriate combinations.

Although examples of the present disclosure have been described above, the present disclosure is not limited to the above description, and obviously various other modifications may the implemented within a range not departing from the spirit of the present disclosure.

What is claimed is:

1. An onboard system comprising a first ECU and a second ECU respectively installed at a vehicle and configured to communicate with each other via a transmission path using session information,
    the first ECU including:
        a first volatile memory,
        a first non-volatile memory that is not electronically data-rewritable,
        a second non-volatile memory that is electronically data-rewritable, and
        a first processor coupled to the first non-volatile memory,
    the second ECU including:
        a second volatile memory,
        a third non-volatile memory that is not electronically data-rewritable,
        a fourth non-volatile memory that is electronically data-rewritable, and
        a second processor coupled to the third non-volatile memory,
    the first processor and the second processor being configured so as to
        detect a precursor to a communication anomaly,
        in a case in which the communication anomaly precursor has not been detected, cause first session information to be stored in the first volatile memory and the second volatile memory, while not causing the first session information to be stored in the second non-volatile memory or the fourth non-volatile memory, and
        in a case in which the communication anomaly precursor has been detected, cause the first session information to be stored in at least the second non-volatile memory and the fourth non-volatile memory, or cause second session information that is generated by the first processor or the second processor and that is different from the first session information to be stored in at least the second non-volatile memory and the fourth non-volatile memory.

2. The onboard system of claim 1, wherein configuration is made such that the second session information is generated on one occasion only, includes information of the first session information from which a sequence number has been excluded, and also includes a value that is updated at a predetermined timing and that can be acquired from the vehicle itself.

3. The onboard system of claim 1, wherein:
after the communication anomaly has ended, one processor of the first processor or the second processor is configured to transmit the first session information or the second session information to another processor of the first processor or the second processor; and
the other processor is configured so as to restore communication in a case in which the first session information or the second session information transmitted from the one processor is present in the second non-volatile memory or the fourth non-volatile memory corresponding to the other processor.

4. The onboard system of claim 3, wherein, in a case in which the communication is restored, the other processor is configured to update a sequence number of the first session information or allocate a new sequence number to the second session information in relation to the first session information or the second session information transmitted from the one processor.

5. The onboard system of claim 1, wherein the first processor and the second processor are configured to:
check during the communication as to whether or not the first session information or the second session information relating to the communication is present in a corresponding memory of the first volatile memory or the second volatile memory;
end the checking in a case in which the first session information or the second session information relating to the communication is present in the corresponding memory of the first volatile memory or the second volatile memory; and
check whether or not the first session information or the second session information relating to the communication is present in a corresponding memory of the second non-volatile memory or the fourth non-volatile memory in a case in which the first session information or the second session information relating to the communication is not present in the corresponding memory of the first volatile memory or the second volatile memory.

6. The onboard system of claim 5, wherein the first processor and the second processor are configured to establish new session information in a case in which the first session information or the second session information relating to the communication is not present in the corresponding memory of the second non-volatile memory or the fourth non-volatile memory.

7. A communication method for an onboard system including a first ECU and a second ECU respectively installed at a vehicle and configured to communicate with each other via a transmission path using session information,
the first ECU including:
a first volatile memory,
a first non-volatile memory that is not electronically data-rewritable,
a second non-volatile memory that is electronically data-rewritable, and
a first processor coupled to the first non-volatile memory,
the second ECU including:
a second volatile memory,
a third non-volatile memory that is not electronically data-rewritable,
a fourth non-volatile memory that is electronically data-rewritable, and
a second processor coupled to the third non-volatile memory,
the communication method being performed by the first processor and the second processor, the communication method comprising:
detecting a precursor to a communication anomaly;
in a case in which the communication anomaly precursor has not been detected, causing first session information to be stored in the first volatile memory and the second volatile memory, while not causing the first session information to be stored in the second non-volatile memory or the fourth non-volatile memory; and
in a case in which the communication anomaly precursor has been detected, causing the first session information to be stored in at least the second non-volatile memory and the fourth non-volatile memory, or causing second session information that is generated by the first processor or the second processor and that is different from the first session information to be stored in at least the second non-volatile memory and the fourth non-volatile memory.

8. The communication method of claim 7, wherein configuration is made such that the second session information is generated on one occasion only, includes information of the first session information from which a sequence number has been excluded, and also includes a value that is updated at a predetermined timing and that can be acquired from the vehicle itself.

9. The communication method of claim 7, wherein:
after the communication anomaly has ended, one processor of the first processor or the second processor is configured to transmit the first session information or the second session information to another processor of the first processor or the second processor; and
the other processor is configured so as to restore communication in a case in which the first session information or the second session information transmitted from the one processor is present in the second non-volatile memory or the fourth non-volatile memory corresponding to the other processor.

10. The communication method of claim 9, wherein, in a case in which the communication is restored, the other processor is configured to update a sequence number of the first session information or allocate a new sequence number to the second session information in relation to the first session information or the second session information transmitted from the one processor.

11. The communication method of claim 7, wherein the first processor and the second processor are configured to:
check during the communication as to whether or not the first session information or the second session information relating to the communication is present in a corresponding memory of the first volatile memory or the second volatile memory;
end the checking in a case in which the first session information or the second session information relating to the communication is present in the corresponding memory of the first volatile memory or the second volatile memory; and check whether or not the first session information or the second session information relating to the communication is present in a corresponding memory of the second non-volatile memory or the fourth non-volatile memory in a case in which the first session information or the second session information relating to the communication is not present in the corresponding memory of the first volatile memory or the second volatile memory.

12. The communication method of claim 11, wherein the first processor and the second processor are configured to establish new session information in a case in which the first session information or the second session information relating to the communication is not present in the corresponding memory of the second non-volatile memory or the fourth non-volatile memory.

13. A non-transitory storage medium storing a program for a vehicle system including a first ECU and a second ECU respectively installed at a vehicle and configured to communicate with each other via a transmission path using session information, the first ECU including:
a first volatile memory,
a first non-volatile memory that is not electronically data-rewritable,
a second non-volatile memory that is electronically data-rewritable, and
a first processor coupled to the first non-volatile memory, the second ECU including:
a second volatile memory,
a third non-volatile memory that is not electronically data-rewritable,
a fourth non-volatile memory that is electronically data-rewritable, and
a second processor coupled to the third non-volatile memory, the program being executable by the first processor and the second processor to execute communication processing, the communication processing comprising:
detecting a precursor to a communication anomaly;
in a case in which the communication anomaly precursor has not been detected, causing first session information to be stored in the first volatile memory and the second volatile memory, while not causing the first session information to be stored in the second non-volatile memory or the fourth non-volatile memory; and
in a case in which the communication anomaly precursor has been detected, causing the first session information to be stored in at least the second non-volatile memory and the fourth non-volatile memory, or causing second session information that is generated by the first processor or the second processor and that is different from the first session information to be stored in at least the second non-volatile memory and the fourth non-volatile memory.

14. The non-transitory storage medium of claim 13, wherein the second session information is generated on one occasion only, includes information of the first session information from which a sequence number has been excluded, and also includes a value that is updated at a predetermined timing and that can be acquired from the vehicle itself.

15. The non-transitory storage medium of claim 13, wherein:
after the communication anomaly has ended, one processor of the first processor or the second processor is configured to transmit the first session information or the second session information to another processor of the first processor or the second processor; and
the other processor is configured so as to restore communication in a case in which the first session information or the second session information transmitted from the one processor is present in the second non-volatile memory or the fourth non-volatile memory corresponding to the other processor.

16. The non-transitory storage medium of claim 15, wherein, in a case in which the communication is restored, the other processor is configured to update a sequence number of the first session information or allocate a new sequence number to the second session information in relation to the first session information or the second session information transmitted from the one processor.

17. The non-transitory storage medium of claim 13, wherein the first processor and the second processor are configured to:
check during the communication as to whether or not the first session information or the second session information relating to the communication is present in a corresponding memory of the first volatile memory or the second volatile memory;
end the checking in a case in which the first session information or the second session information relating to the communication is present in the corresponding memory of the first volatile memory or the second volatile memory; and
check whether or not the first session information or the second session information relating to the communication is present in a corresponding memory of the second non-volatile memory or the fourth non-volatile memory in a case in which the first session information or the second session information relating to the communication is not present in the corresponding memory of the first volatile memory or the second volatile memory.

18. The non-transitory storage medium of claim 17, wherein the first processor and the second processor are configured to establish new session information in a case in which the first session information or the second session information relating to the communication is not present in the corresponding memory of the second non-volatile memory or the fourth non-volatile memory.

* * * * *